US007708507B2

(12) United States Patent
Feng

(10) Patent No.: US 7,708,507 B2
(45) Date of Patent: May 4, 2010

(54) LOCKING MECHANISM FOR WHEELCHAIR IN VEHICLE

(76) Inventor: Zhide Feng, 1919 Atlas Ct., Troy, MI (US) 48083

( * ) Notice: Subject to any disclaimer, the term of this patent is extended or adjusted under 35 U.S.C. 154(b) by 472 days.

(21) Appl. No.: 11/561,890

(22) Filed: Nov. 20, 2006

(65) Prior Publication Data

US 2007/0126245 A1 Jun. 7, 2007

Related U.S. Application Data

(60) Provisional application No. 60/738,289, filed on Nov. 18, 2005.

(51) Int. Cl.
*B60P 7/08* (2006.01)

(52) U.S. Cl. ................................................ 410/7; 410/4

(58) Field of Classification Search ..................... 410/3, 410/4, 7, 9, 19, 22, 51, 80; 280/304.1; 248/503, 248/503.1; 296/65.04; 297/DIG. 4
See application file for complete search history.

(56) References Cited

U.S. PATENT DOCUMENTS 6,575,677 B2 * 6/2003 Craft ............................ 410/7

* cited by examiner

*Primary Examiner*—Stephen Gordon
(74) *Attorney, Agent, or Firm*—Patwire LLC; Mark David Torche

(57) ABSTRACT

A locking mechanism to secure a wheelchair while transporting in a vehicle comprises a base with a guide channel adapted to accept a catch pin and has been secured to a wheelchair. The catch pin is guided into the channel by an angled portion of the base. A locking mechanism cooperates with a pivot plate to secure the catch pin within the guide channel. A release mechanism allows disengagement. The guide channel includes a deformation groove that allows the mechanism to operate even when the metal has been deformed through repeated use. Lips are also provided at critical locations to allow free rotation of the parts even when the metal is deformed due to use.

15 Claims, 4 Drawing Sheets

LOCKING MECHANISM FOR WHEELCHAIR IN VEHICLE

RELATED APPLICATIONS

This application claims priority and herein incorporates by reference U.S. provisional patent application 60/738,289, filed Nov. 18, 2005.

BACKGROUND OF THE INVENTION

The danger of loose items moving or shifting around in a vehicle is apparent. The danger is even greater when transporting wheelchairs users. There are been many lock down mechanisms proposed. Over time, many of these mechanisms become inoperable or difficult to use due to metal fatigue. A phenomenon known as mushrooming can occur when metal is repeatedly compressed.

There remains a need for an easy to use, reliable and secure mechanism to safely transport wheelchairs in a vehicle.

SUMMARY OF THE INVENTION

A locking mechanism to secure a wheelchair while transporting in a vehicle comprises a base with a guide channel adapted to accept a catch pin and has been secured to a wheelchair. The catch pin is guided into the channel by an angled portion of the base. A locking mechanism cooperates with a pivot plate to secure the catch pin within the guide channel. A release mechanism allows disengagement. The guide channel includes a deformation groove that allows the mechanism to operate even when the metal has been deformed through repeated use. Lips are also provided at critical locations to allow free rotation of the parts even when the metal is deformed due to use.

Other features and advantages of the instant invention will become apparent from the following description of the invention which refers to the accompanying drawings.

DETAILED DESCRIPTION OF THE INVENTION

Figure 1:
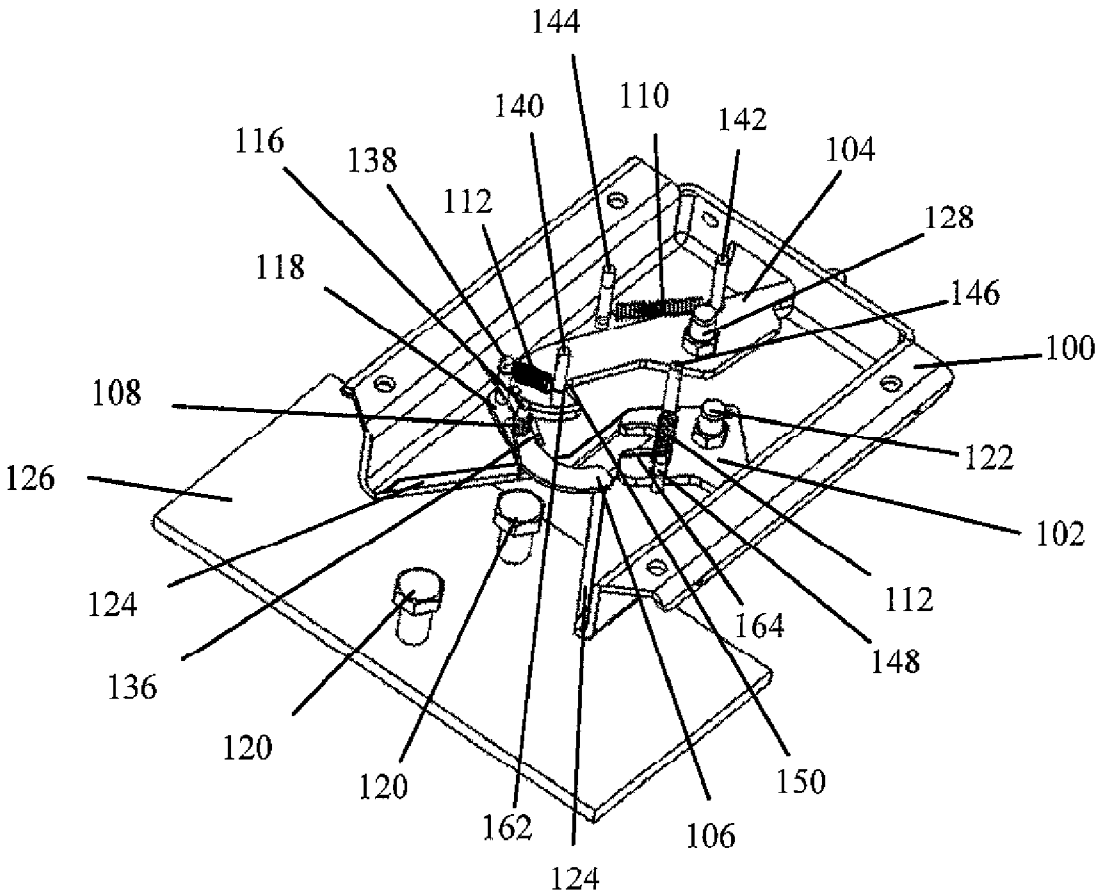
FIG. 1 is a perspective drawing of the mechanism in an open position according to an embodiment of the present invention.
Figure 2:
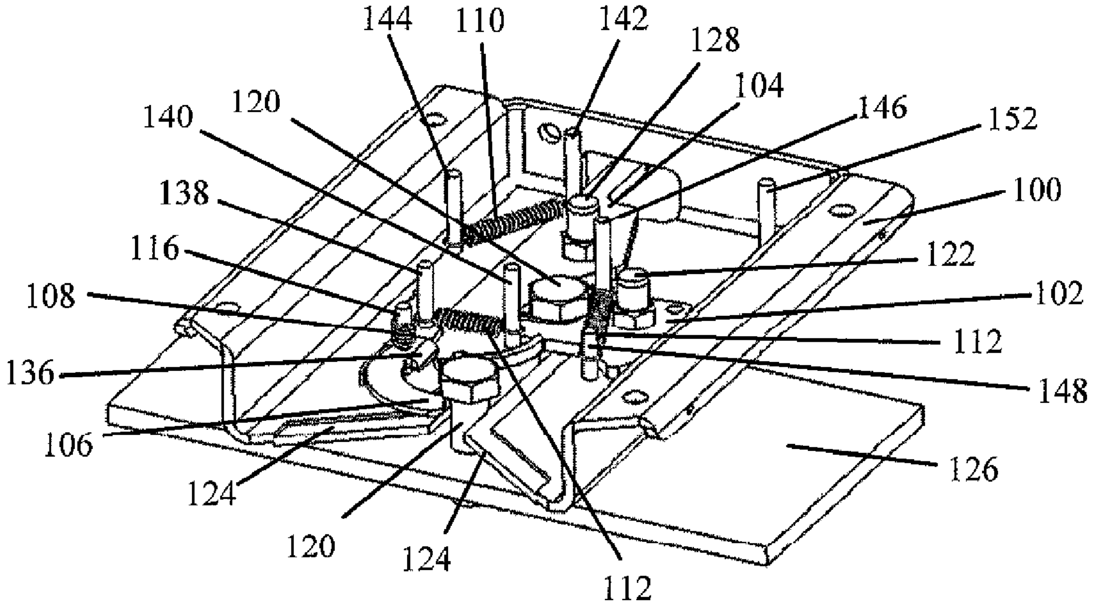
FIG. 2 is another perspective drawing of the mechanism in a closed position according to an embodiment of the present invention.
Figure 3:
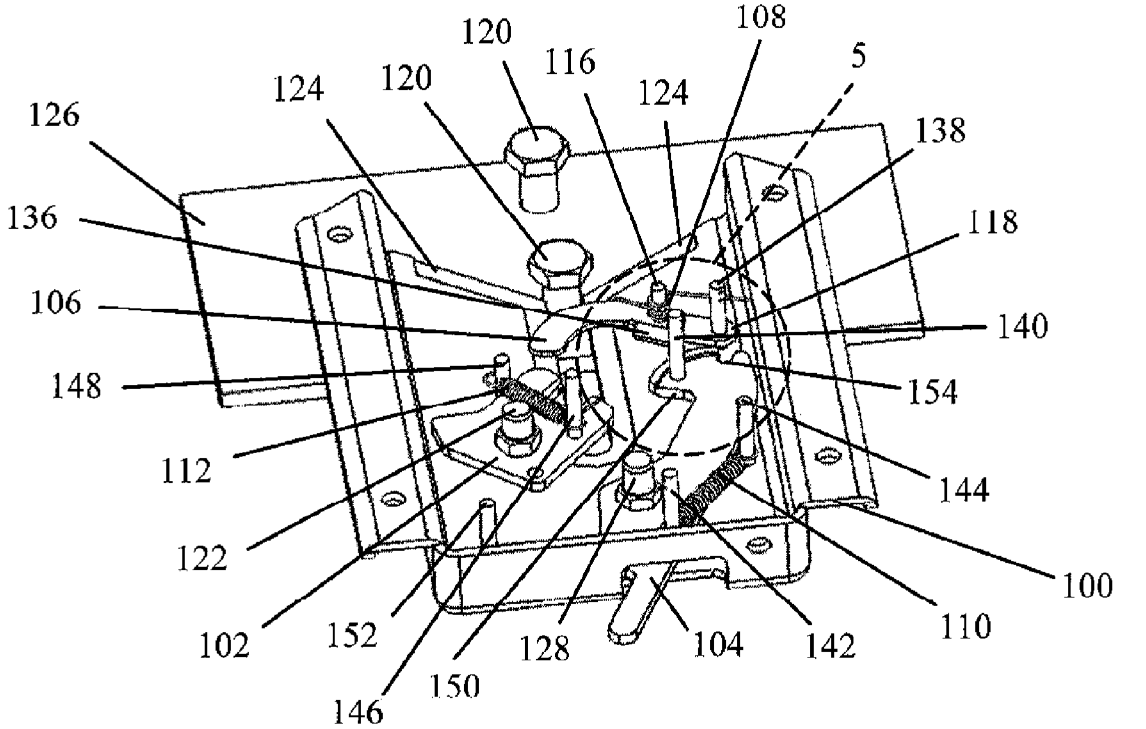
FIG. 3 is yet another perspective drawing according to an embodiment of the present invention.

Reference is now made to the drawings in which reference numerals refer to like elements.

Referring now to FIGS. 1, 2, 3, 5 and 7, a locking mechanism for a wheelchair includes a base 100 may be attached to a vehicle (not shown) in order to secure a wheelchair. Base 100 may be bolted, welded, riveted or secured by other means known in the art. A front portion of base 100 is angled to ease guiding catch pin 120 into a channel guide. Although in the embodiment shown, two catch pins 120 are shown, other combinations such as using only one catch pin or three catch pins may be used. An advantage to multiple catch pins is resistance to rotation. Catch pin 120 may be mounted to an attachment plate 126 to facilitate mounting a wheelchair. As catch pin 120 makes contact with a trigger plate 106, trigger plate 106 rotates around a stationary pin 116, which is secured to base 100. A stopper plate 118 also rotates around stationary pin 116. A stopper plate pin 138 is located at the other end of stopper plate 118 and rotates with stopper plate 118. A torsion spring, 108 provides biasing pressure between trigger plate 106 and stopper plate 118. Torsion spring 108 fits around stationary pin 116.

Trigger plate 106 has a trigger plate flange 136 that engages stopper plate 118 in one direction only. A locking plate 104 is pivotally connected to base 100 by a locking plate pin 128 which is secured to base 100. One end of locking plate 104 has a locking plate latch 150, which engages a pivot plate 102. Locking plate latch 150 is biased against stopper plate 118 by a pivot plate extension spring 150. Locking plate latch 150 includes a locking plate pin 140 mounted to its surface. Pivot plate extension spring 150 is attached between locking plate pin 140 and stopper plate pin 138 mounted thereon. Locking plate 104 has a locking plate notch 154 along its outer periphery that engages with a stopper plate pin 138 locking plate 104 in an open condition. In this condition, the wheelchair may be removed. As catch pin 120 makes contact with trigger plate 106, stopper plate pin 138 moves out of position from locking plate notch 154 to move back into a locked condition. As catch pin 120 moves along the channel guide, it encounters pivot plate 102 which includes a semicircular slotted opening that engages with catch pin 120. As pivot plate 102 rotates around catch pin 120, locking plate 104 moves into position securing catch pin 120 within pivot plate 102 and locking plate latch 150 prevents further movement.

Pivot plate 102 is biased using a pivot plate extension spring 150 which is connected to a pivot plate pin 146 mounted on the surface of pivot plate 102 and a stationary pin 148 mounted to base 100 and rotates about a pivot plate pin 122 fixed to base 100. Although the embodiment shown include pivot plate 106, it is possible to eliminate pivot plate 106 by using an elongated stopper plate 118. Additionally, pivot plate 102 is not essential to the present invention. Locking plate 104 is capable of securely holding catch pin 120 by itself.

Locking plate 104 is released from the locked position by applying a force to the release end of locking plate 104 causing locking plate latch 152 to move out of the locked position. Locking plate 104 is biased by locking plate extension spring 110, which is attached to a release lever pin mounted on the surface of locking plate 104 and to a stationary pin connected to base 100.

In use when catch pin 120 slams against the end of the channel guide, it can deform the metal causing it to mushroom and interfering with the rotation of locking plate 104. In order to overcome this problem a deformation groove 124 is provided so that locking plate 104 is rotating on a different plane than the metal at the end of deformation groove 124. Additionally, the metal can deform around when stopper plate pin 138 engages with locking plate notch 154. To provide for proper function even if this happens, a locking plate latch lip 162 is provided to allow stopping plate 118 to rotate even if metal deformation happens. Likewise, metal deformation can also occur around the interior portion of pivot plate 102 when catch pin 120 engages. A pivot plate lip 164 is provided to overcome this.

Figure 4:
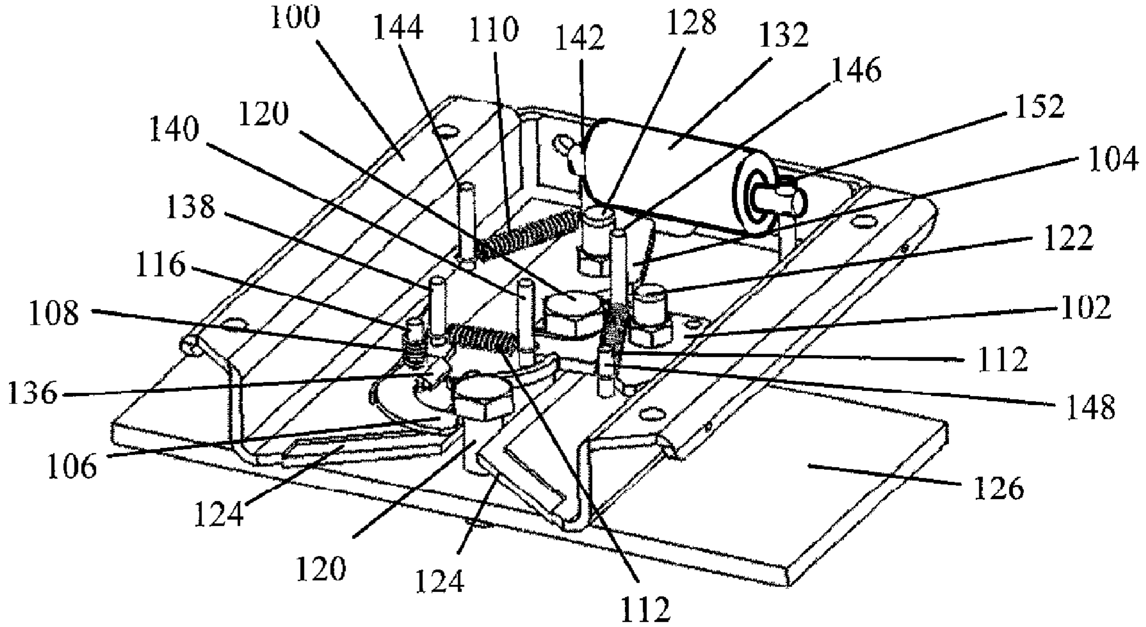
FIG. 4 is a perspective drawing showing the placement of a solenoid according to an embodiment of the present invention.
Figure 5:
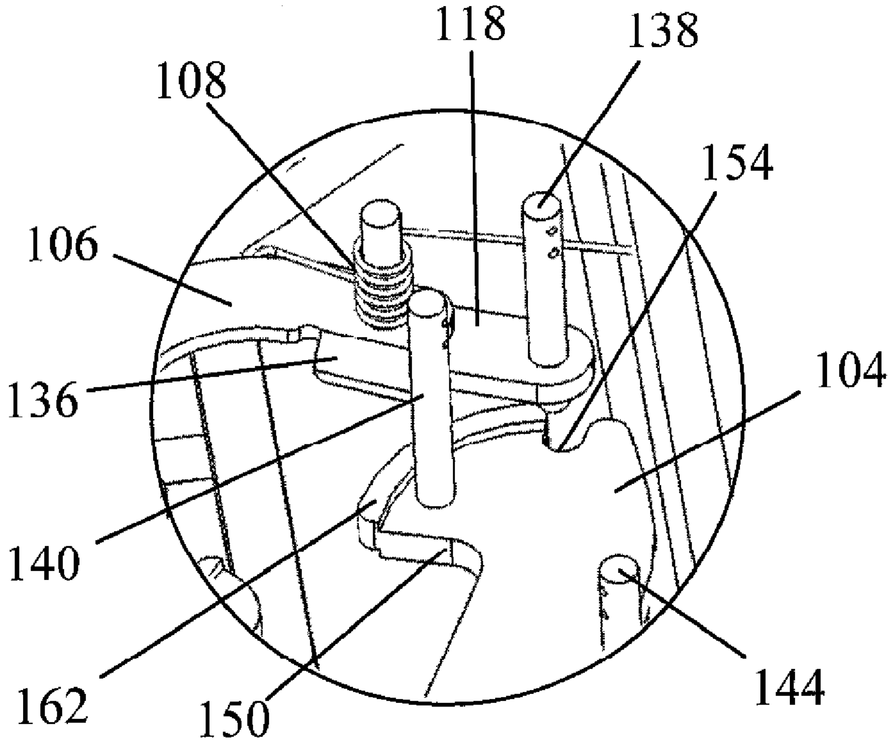
FIG. 5 is a close-up of the section shown in FIG. 4.
Figure 6:
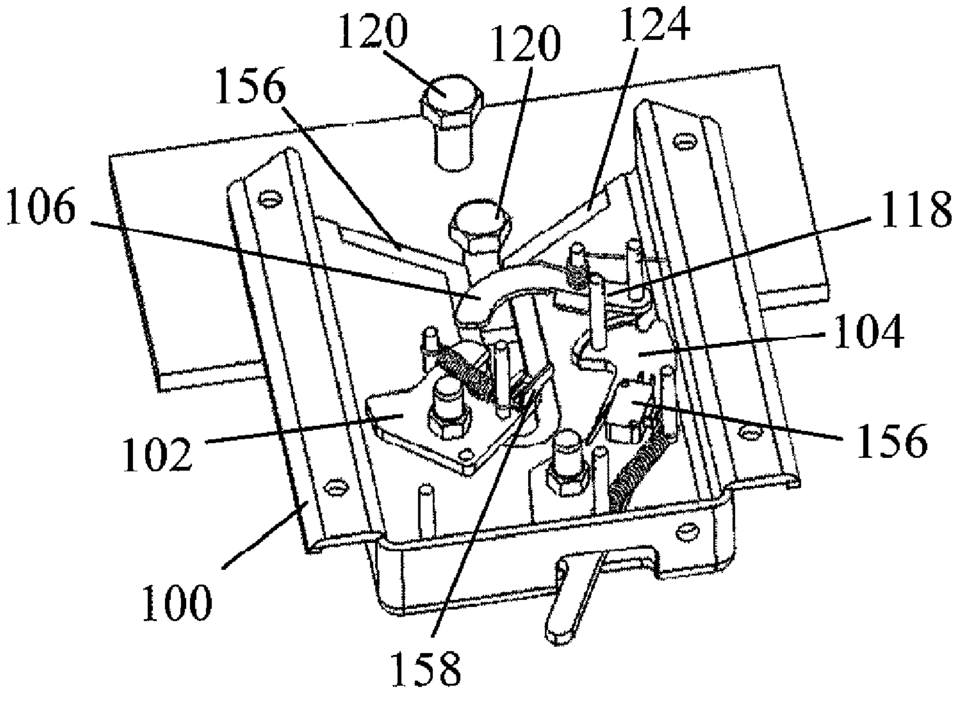
FIG. 6 is a perspective drawing showing the placement of switches according to an embodiment of the present invention.
Figure 7:
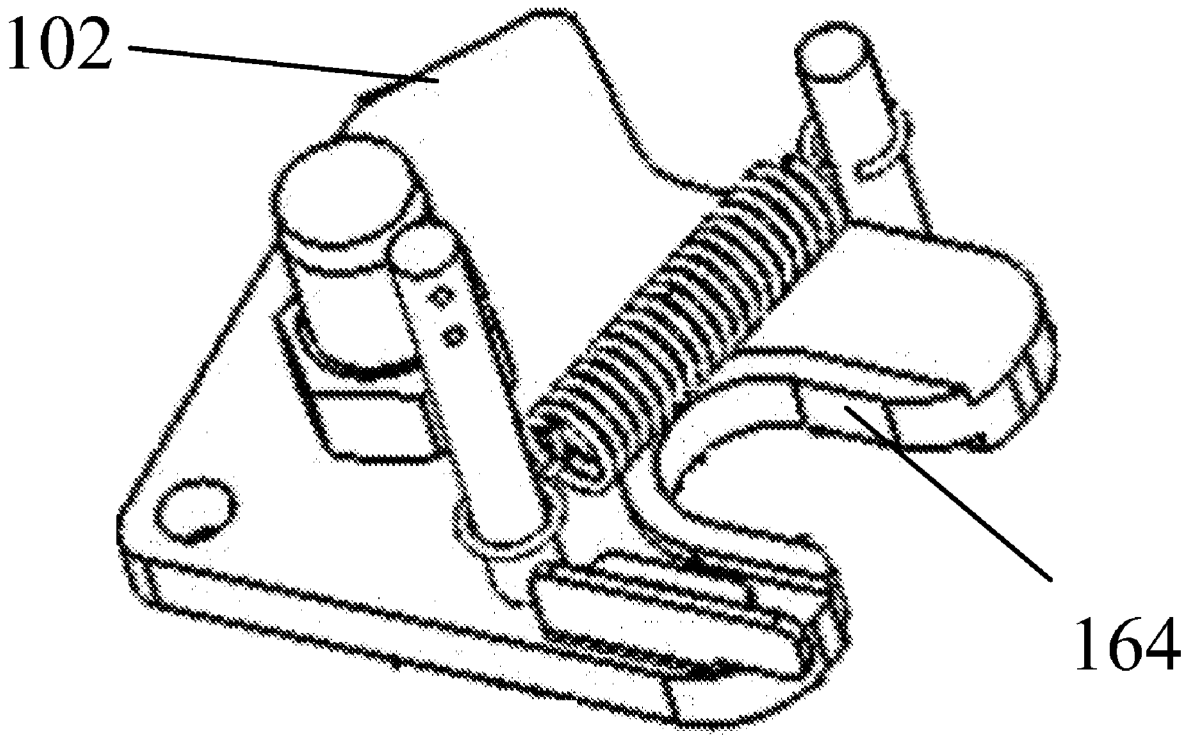
FIG. 7 is a detailed drawing of the pivot plate according to an embodiment of the present invention.

Referring now to FIGS. 4 and 6, a solenoid 122 is provided to provide electronic operation of the present invention. Solenoid 122 is mounted between a stationary pin 152 attached to base 100 and release lever pin 142 attached to the release lever end of locking plate 104. Solenoid 132 may be operated by a wired switch or a remote control as is known in the art. Additionally, a switch 156 may be mounted to provide remote status of the position of locking plate 104 further enhancing safety. A switch trigger may be mounted on pivot plate 102 to engage switch 156 when catch pin 120 is securely in place.

Although in the embodiments shown, a stopper plate pin 138 is used to engage with locking plate notch 154, any suitable engagement arrangement would work such as an enlarged portion of stopper plate 118. The only requirement being that the engagement portion should be able to be selectively positioned within locking plate notch 154.

Although the instant invention has been described in relation to particular embodiments thereof, many other variations and modifications and other uses will become apparent to those skilled in the art.

What is claimed is:

1. A locking mechanism for a wheelchair comprising:
- a base having a guide channel disposed therein;
- a locking plate moveably connected to said base;
- said locking plate having a locking plate latch portion disposed on an end;
- said locking plate also having a locking plate notch distally disposed along a perimeter of said end therein;
- a stopper plate moveably connected to said base;
- said stopper plate having an engagement portion adapted to moveably engage said locking plate notch between an open position and a closed position;
- at least one catch pin secured to a wheelchair and adapted to fit within said guide channel; and
- said locking plate adapted to releasably hold said at least one catch pin.

2. A locking mechanism for a wheelchair according to claim 1 further comprising:
- a deformation trench disposed along a perimeter of said guide channel, wherein said locking plate and said stopper plate both rotate on a plane offset to said deformation trench and will continue to operate even in the event of deformation due to use.

3. A locking mechanism for a wheelchair according to claim 1 further comprising a release lever disposed on an opposite end of said locking plate.

4. A locking mechanism for a wheelchair according to claim 1 further comprising:
- a first stationary pin fixedly connected to said base;
- a trigger plate being rotatably attached to said first stationary pin;
- said stopper plate being rotatably attached to said first stationary pin;

a torsion spring fitted over said first stationary pin and adapted to bias said trigger plate against said stopper plate.

5. A locking mechanism for wheelchair according to claim 4 further comprising:
- a second stationary pin fixedly connected to said base;
- a pivot plate pin disposed on an upper surface of a pivot plate; and
- a pivot plate extension spring disposed between said second stationary pin and said pivot plate pin.

6. A locking mechanism for a wheelchair according to claim 5 further comprising:
- a third stationary pin fixedly connected to said base;
- a release lever pin proximally disposed towards said opposite end of said locking plate; and
- a release lever extension spring disposed between said third stationary pin and said release lever pin.

7. A locking mechanism for a wheelchair according to claim 6 further comprising:
- a locking plate pin disposed on said end of said locking plate; and
- a locking plate extension spring disposed between said locking plate pin and a stopper plate pin.

8. A locking mechanism for a wheelchair according to claim 7 further comprising a pivot plate pivot pin fixedly attached to said base wherein said pivot plate rotates about said pivot plate pivot pin.

9. A locking mechanism for a wheelchair according to claim 8 further comprising a locking plate pivot pin fixedly attached to said base wherein said locking plate rotates about said locking plate pivot pin.

10. A locking mechanism for a wheelchair according to claim 1 further comprising a wear lip along an engagement periphery of said locking plate latch portion wherein said locking plate latch will continue to operate even if said locking plate notch is deformed due to use.

11. A locking mechanism for a wheelchair according to claim 10 further comprising a second wear lip along an inner periphery of a pivot plate wherein said pivot plate will continue to operate even if said pivot plate is deformed due to use.

12. A locking mechanism for a wheelchair according to claim 6 further comprising:
- a solenoid; and
- a fourth stationery pin fixedly connected to said base; said solenoid is disposed between said fourth stationery pin and said release lever pin, to allow electronic operation thereof.

13. A locking mechanism for a wheelchair according to claim 12 further comprising:
- a switch disposed along said locking plate;
- a switch trigger disposed along said pivot plate, wherein when said pivot plate rotates to a selected position said switch trigger engages said switch.

14. A locking mechanism for a wheelchair according to claim 1 wherein said locking mechanism is made from metal.

15. A locking mechanism for a wheelchair, according to claim 1 wherein said locking mechanism made from a composite material.

* * * * *